United States Patent [19]

Broadhurst et al.

[11] 3,821,713

[45] June 28, 1974

[54] MULTIPLE-STATION RECEIVER-CONTROLLED TRANSMISSION LOOP INTERFACE FOR DATA TRANSFER AND CONTROL BETWEEN DATA PROCESSING SYSTEMS AND SUBSYSTEMS

[75] Inventors: Dennis Broadhurst, La Grangeville; Brian B. Moore, Syracuse, both of N.Y.

[73] Assignee: International Business Machines Corporation, Armonk, N.Y.

[22] Filed: Dec. 29, 1972

[21] Appl. No.: 319,260

[52] U.S. Cl. .......... 340/172.5
[51] Int. Cl. .......... G06f 9/18
[58] Field of Search .......... 340/172.5, 147 R; 179/15 AL, 15 BD

[56] References Cited

UNITED STATES PATENTS

| | | | |
|---|---|---|---|
| 3,245,043 | 4/1966 | Gaffney, Jr. et al. | 340/172.5 |
| 3,544,976 | 12/1970 | Collins | 340/172.5 |
| 3,623,003 | 11/1971 | Hewitt | 340/172.5 |
| 3,633,166 | 1/1972 | Picard | 340/147 X |

*Primary Examiner*—Raulfe B. Zache
*Attorney, Agent, or Firm*—Owen L. Lamb

[57] ABSTRACT

A communication mechanism in which subsystems are attached in a loop and communication between subsystems is accomplished in accordance with a demand-frame/response-frame discipline in which the receiving subsystem in the loop controls the frame generation mechanism with respect to another subsystem. A frame is the smallest unit of information transmitted between units attached to an interface between subsystems and may be used for data and/or control information. Frames are transmitted between subsystems over the interface in a bit-serial form. Each attached subsystem has a line adapter which 1) receives frames in parallel form from the unit's frame logic and transmits the frames in a bit-serial form to the proper attached subsystem, and 2) receives the frames in a bit-serial form from other attached subsystems and transmits them in parallel form to the subsystem's frame logic.

8 Claims, 11 Drawing Figures

FRAME GENERATE LOGIC

FRAME GENERATE LOGIC

PASS MONITOR INSERT (PMI) LOGIC

FRAME GENERATOR SEQUENCE

FRAME MONITOR SEQUENCE

PASS MONITOR INSERT SEQUENCE

MULTIPLE-STATION RECEIVER-CONTROLLED TRANSMISSION LOOP INTERFACE FOR DATA TRANSFER AND CONTROL BETWEEN DATA PROCESSING SYSTEMS AND SUBSYSTEMS

CROSS REFERENCE TO RELATED APPLICATIONS

U.S. Pat. application Serial Number 319,958 filed December 29, 1972 entitled "Communication Mechanism For Data Transfer And Control Between Data Processing Systems And Subsystems" by B. B. Moore and C. A. Thorn.

FIELD OF THE INVENTION

The invention relates to data processing systems and more particularly to apparatus for communication between data processing systems and subsystems.

In the above-identified B. B. Moore et al. patent application, a communication apparatus is disclosed which is comprised of two separate and functionally independent logical elements. The first is an external main storage adapter which performs the function of sharing storage between the central processing unit and a subsystem element. The second logical unit is the control adapter which provides the physical and logical connection between the subsystem elements. The control adapter attaches to a control interface which contains a polling mechanism, a selection mechanism, a general bus, and several interlocked communication tag lines. A control transfer sequence is defined by the interface such that each attached subsystem may initiate communication with any other attached subsystem. The polling mechanism allocates temporary control of the interface to a unit desiring to initiate communication. The selection mechanism allows selective sub-system-to-subsystem communication.

The interface defined in the referenced patent application is a DC interlocked, parallel information transfer type of interface. This type of interface has several shortcomings. It requires a large number of cables between attached units and there is a limitation on the interface cable length. Data transfer rates are limited by the DC interlock definition and they deteriorate with increased physical separation. A remote connection by means of the interface is impractical. Due to the point-to-point definition of the data transfer and interruption request path, interface symmetry is obtainable only at a high cost and cabling complexity. There are only two sets of data transfer tag lines so that an attached unit can work in, at most, two main storage sectors simultaneously.

SUMMARY OF THE INVENTION

It is an object of this invention to provide a communication mechanism for a data processing system in which a single multiplex cable for each communication path passes from one subsystem to the next subsystem in a chained manner.

It is a further object of this invention to provide an improved communication mechanism between subsystems such that subsystems may be separated at greater distances.

It is a further object of this invention to provide an improved communication mechanism between subsystems in which a large number of subsystems may be attached to a single interface.

It is a further object of this invention to provide a communication mechanism between subsystems in which data transfer rates do not decrease with physical separation of the subsystem.

It is a further object of this invention to provide a communication path between subsystems in which a remote connection is practical.

It is a further object of this invention to provide a symmetrical interface in which there are no point-to-point lines.

It is a further object of the invention to provide an interface that can take advantage of main storage interleaving.

Briefly, the above objects are accomplished in accordance with the invention by providing a communication mechanism between computer subsystems and a central processing unit of said computer in which a serial data transfer path is provided.

The minimum amount of information transferred between units is called the frame. A frame is a fixed length field of logical ones and zeros which represent information being transmitted from one unit to another. It may take several frames to execute an operation on the interface.

There are three types of frames used, full, empty and idle. Frames are held in a parallel buffer-like form and are transmitted between units attached to the loop interface in bit-serial form. The serial interface contains several independent bit streams so that several frames may be in transit simultaneously via different bit streams. Each serial interface bit stream is a single controller which provides bit clocking and frame synchronization for its bit stream. All the other attached units monitor this bit stream and they may send information in the bit stream in accordance with a frame protocol. Thus, each bit stream is a distributed multi-point line passing from unit to unit in a loop manner.

The full frames are used to transfer data or control information by a demand-response discipline. Thus, for every demand-frame transmitted, there is an associated response frame.

DETAILED DESCRIPTION

Figure 1:
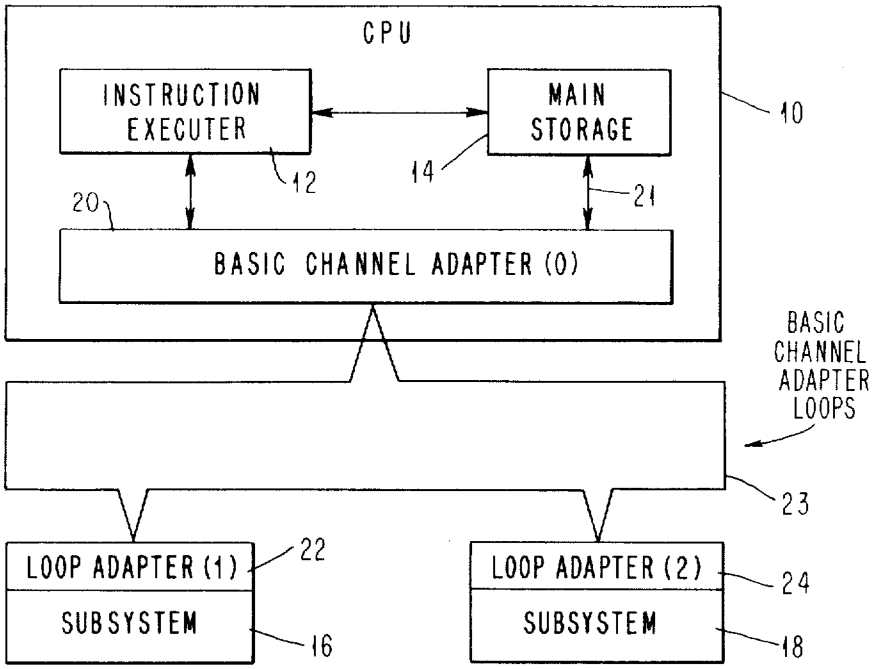
FIG. 1 is a schematic drawing showing interconnection of three adapters in which the invention is embodied.

Referring to FIG. 1, an overall block diagram of a data processing system embodying the invention is shown. A central processing unit 10 includes an instruction execution unit 12 and a main storage 14. The instruction executor communicates with subsystems 16 and 18 by means of a basic channel adapter 20. There are three serial paths connecting the basic channel adapter 20 with the loop adapters 22 and 24 associated with the subsystems. These paths are illustrated by the basic channel adapter loops line 23 and are illustrated in more detail in FIG. 2.

As more fully described in the above-identified Moore et al. patent application, a subsystem 16 responds to a signal processor instruction which directs the sub-system to read input data. The subsystem accepts a parameter address from the CPU by means of the basic channel adapter 20. The CPU is then released and continues with instruction processing. As data is read by the subsystem, the data is transferred to main storage 14 by means of one of the basic channel adapter loops through the basic channel adapter 20 and path 21. After all the data has been transferred, the subsystem requests a priority interruption of the CPU to signal the program in the CPU that the data has been transferred. This communication is also accomplished over one of the basic channel adapter loops 23. When the CPU is in the correct condition to accept an interruption, it signals by means of the basic channel adapter that this interruption is being accepted. The subsystem then sends status over one of the basic channel adapter loops and the CPU processes the interruption.

If the subsystem is a data channel, then an instruction called Start I/O is executed by the data channel and I/O interruptions are processed.

Thus, there are two separate functions accomplished by the basic channel adapter: the signal processor instruction and its interruptions and the distinct Start I/O instruction and its interruptions, all handled over a serial basic channel adapter loop 23. Thus, the system has the advantage that it operates in a high speed serial mode but is still subsettable in that a given subsystem can utilize either one or both of the above functions without having to resolve contention between the two instructions.

Figure 2:
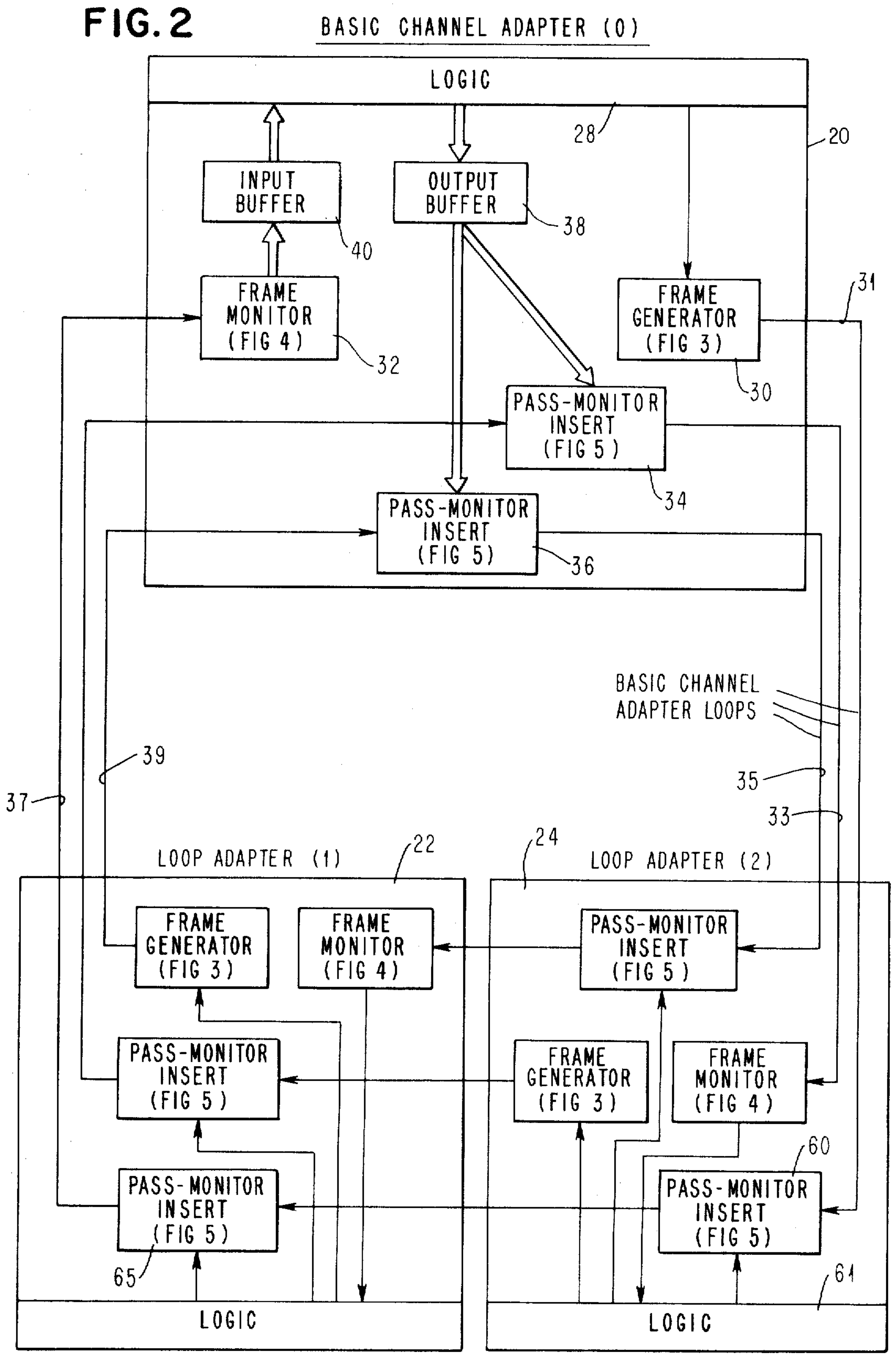
FIG. 2 is a more detailed block diagram of the blocks in FIG. 1 showing the interconnection of three loops and the frame logic for synchronizing the loops.

Referring now to FIG. 2, the basic channel adapter 20, the loop adapter 22 and the loop adapter 24 are shown in more detail. Each of the adapters are identical and so the following description will be limited mainly to a description of the basic channel adapter 20.

The basic channel adapter 20 includes logic 28 for interfacing the frame discipline hardware with the remainder of the subsystem which, in this case, is the instruction executor and the main storage.

Frame logic is comprised of a frame generator 30, a frame monitor 32, a pass monitor insert 34, and a pass monitor insert 36. There are as many pass monitor inserts in a particular adapter as is necessary to handle the number of basic channel adapter loops. The number of loops depends upon the number of subsystems which are attached together. An output buffer 38 is provided between the pass monitor insert logic and the logic 28. An input buffer 40 is provided between the frame monitor 32 and the logic 28.

The frame generator 30 is connected to the next unit's loop adapter by means of loop connection 31 and passes through the pass monitor insert logic 60 of loop adapter 2, the output of which is connected to the pass monitor insert logic 65 of loop adapter 1 and from thence back to basic channel adapter 0 and the frame monitor logic 32.

Each unit provides bit clocking and frame synchronization for its bit stream. All other attached units monitor this bit stream by means of the pass monitor insert logic.

A unit transmits an empty frame if it wishes to solicit information from an attached unit. The empty frame is passed from unit to unit until it is either changed to a full frame or arrives back unchanged. Attached units examine the frame in sequence and they either send information to the initiating unit by changing the empty frame to a full frame or else may pass the empty frame along unchanged.

A unit may not transmit an empty frame unless it is able to accept the information in a full frame in return. That is, the unit must anticipate that all empty frames transmitted might return as full frames.

A unit transmits an idle frame to maintain synchronization of its bit stream in circumstances when no other frame is to appear in the stream. Idle frames are passed from unit to unit unchanged and eventually return to the initiating unit.

Full frames are passed from unit to unit unchanged and the contents of full frames returning on the controller's bit stream are transmitted in parallel to the subsystem.

Full Frame

Full frames are used to transfer both data and control information between subsystems attached to the serial interface. Full frames are either data transfer frames or control transfer frames and conform to a demand-frame response-frame discipline. For every demand frame transmitted on a serial interface, there is an associated response frame. There are four varieties of full frame:

data transfer demand;
data transfer response;
control transfer demand;
control transfer response.

All full frames contain 136 information bits including subfields for the following information;

*T* The frame type (i.e., full) of the frame. The type field is contained in bits 0–1 of the frame. For a full frame, *T* = binary 10.

*V* The variety of the full frame. The variety field (e.g., data-transfer demand) is contained in bits 2–7 of the frame.

*SU* The unit number of the unit which sends the frame. The sending unit field is contained in bits 8–15 of the frame.

*C* An indicator used for correlating an interface response frame with its associated demand frame. The correlation field is contained in bits 16–19 of the frame.

*CRC* A cyclic redundancy check field for the frame is contained in frame bits 128–135.

In addition, full frames contain variety-dependent information subfields (bits 20–127).

Data-Transfer Demand Frame

A unit sends a data-transfer demand frame to request that another unit either store data in or fetch data from its main-storage. The main-storage address and storage protection key to be used in the main-storage reference appear in the information portion of the frame. If the demand involves a storing of data in main storage, the data also appears in the information portion.

A data-transfer response is sent to the demanding unit at the completion of the required main-storage reference.

The fields in the data-transfer demand frame are as follows:

*T* Binary 10.

*V* Binary 00 00*rp*, where
- *r*=0 on a store
- *r*=1 on a fetch, and
- *p*=0 if no prefixing is required
- *p*=1 if prefixing is required.

*SU* Unit number of the demander.

*C* Sequence ID provided by the demander for correlation. This value is returned in the data-transfer response frame associated with the demand.

Key

Bits 20–23 contain the storage protection key to be used in the main-storage reference.

Marks

Bits 24–31 contain mark bits indicating which of the eight bytes of data in the data field are to be stored in main storage. Mark bit 0 is contained in frame bit 24, mark bit 1 in frame bit 25, etc. Mark bits are examined only on requests to store data (*r*=0). They should be zeros on requests to fetch data (*r*=1).

Address

Bits 32–63 contain the address to be used in the main-storage reference. Bits 61–63 are the least significant bits of the address and must be zero.

Data

If the data-transfer demand frame involves a store (*r*=0), the data are contained in bits 64–127 of the frame. Data byte 0 is contained in bits 64–71, data byte 1 in bits 72–79, etc. Data byte 0, if accompanied by a logical one in mark bit 0 will be stored at the address given by the address field, while data byte 1, if accompanied by a one in mark bit 1 will be stored at the address given by the address plus one, etc.

Data-Transfer Response Frame

A unit sends a data-transfer response frame as its reply to a data-transfer demand frame. The frame contains status information collected by the unit while executing the demand. If the demand involved a fetch of information form main-store, the data also appears in the frame.

The fields in the data-transfer response frame are as follows:

*T* Binary 10.

*V* Binary 000000 01*r*0, where
- *r*=0 if data bytes are not present.
- *r*=1 if data bytes are present.

*SU* Unit number of the unit sending the response.

*C* The *C* field from the associated data-transfer demand frame.

Bits 20–31 unused, must be zeros.

Checks 9

Bits 32–63 contain indications of checks accumulated during the execution of the main-storage reference requested by the demand frame.

Data

If the data-transfer demand frame involved a fetch (*r*=1), then eight bytes of data appear in bits 64–127 of the response. The bytes were fetched from the double word specified by the address in the demand frame.

Control-Transfer Demand Frame

A control-transfer demand frame is sent in any of the following cases:

Instruction Execution

Serial BCA, while acting as the vehicle for the execution of a Signal Processor instruction, sends a control-transfer demand frame to the addressed unit. The control-transfer demand frame contains the function code, the ORB address, and the first word of the ORB.

Interruption Request

A unit attached to Serial BCA wishing to request a priority interruption of an attached central processing unit Serial BCA, sends a control-transfer demand frame containing an indication of the priority level associated with the request.

Interruption Acceptance

Serial BCA sends a control-transfer demand frame when it wishes to accept a priority interruption requested by an attached unit. The frame contains an indication of the priority level of the interruption being accepted.

A control-transfer response frame is always sent to the demander in reply to a control-transfer demand frame.

The fields in the control-transfer demand frame are as follows:

*T* Binary 10.

*V* Binary 001000.

*SU* The unit number of the demander.

*C* The correlation number of the demand. It is returned in the control-transfer response frame associated with the demand.

*I/I* The instruction/interruption field, contained in bits 20–23 of the frame, indicates the situation which caused the unit to transmit the frame. Permissable values are:
- 0100 -Signal Processor execution
- 1000 - Priority interruption request
- 1100 - Priority interruption acceptance.

L When *I/I* is 0100 or 1100 (interruption request or acceptance), *L* contains a binarily encoded representation of the priority level involved. Bit 24 is the most significant bit in the binary representation, bit 31 the least significant.

*ORB* Address The *ORB* address field contains zeros unless the control-transfer-demand frame is associated with Signal Processor execution (*I/I*) = 0100) or priority interruption acceptance (*I/I* = 1100). If so, a word entity is inserted into the *ORB* address field (frame bits 32–63) as follows:
- Signal Processor Execution - the parameter field from the Signal Processor is inserted.
- Priority Interruption Acceptance - the address of the *ORB* associated with the interruption is inserted.

*ORB* Word The ORB word field (frame bits 64–95) contains zeros unless the control-transfer demand indicates Signal Processor execution (*I/I* = 0100).

If so, this field contains the word whose address is given in the *ORB* address field, that is, the first word of the *ORB*.

Function Code The function code field contains zeros unless the control-transfer demand frame is associated with Signal Processor execution (*I/I* = 0100). If so, bits 96–127 of the frame contain the second operand address from the instruction (the function code). The second operand address is treated as a word entity, as is the function code field.

Control-Transfer Response Frames

A unit sends a control-transfer response frame as its reply to a control-transfer demand frame. Thus, the frame contains status information pertinent to the demand.

The fields in the control-transfer response frame are:

*T* Binary 10.

*V* Binary 001100.

*SU* The unit number of the responder.

*C* The correlation indication from the associated demand.

*CC* The condition code field is contained in frame bits 20–23 and must be zeros unless the response is to an instruction-execution or interruption acceptance demand frame. If the former, the *CC* field is as follows:

0000 - Condition code 0.

0001 - Condition code 1.

0010 - Condition code 2.

0011 - Condition code 3.

0100–111 Unused. If the response is to an interruption acceptance demand however, *CC*=0000 unless the subsystem has no interruption on the level or channel indicated (i.e., the interruption has been reset for instance). In this case *CC*=0001 is indicated.

ORB Address The ORB address field is contained in frame bits 32–63. It should be zeros unless the response is to a priority interruption acceptance demand. If the response is to a priority interruption acceptance demand, the *ORB* address field should contain the address of the *ORB* associated with the interruption.

Status The status field is contained in frame bits 64–127. It should be zeros unless the response is to a Signal Processor demand or a priority interruption acceptance demand. The status field of a Signal Processor response contains the status which must be placed in the status register in bits 64–95 and zeros in bits 96–127 (bits 64–71 must be zeros however). The status field of a priority interruption acceptance response contains the double word to be stored at the main-storage location *ORB* address plus 8, that is, the second and third words of the *ORB* associated with the interruption.

Idle Frame

An idle frame contains 136 bits, including the following subfield:

*T* = Binary 11

In addition, the remainder of the frame is unspecified.

Empty Frame

All empty frames contain 136 bits, including the following subfield:

*T* = Binary 01.

In addition, the remainder of the empty frame is unspecified.

Frame Generator

Figure 3:
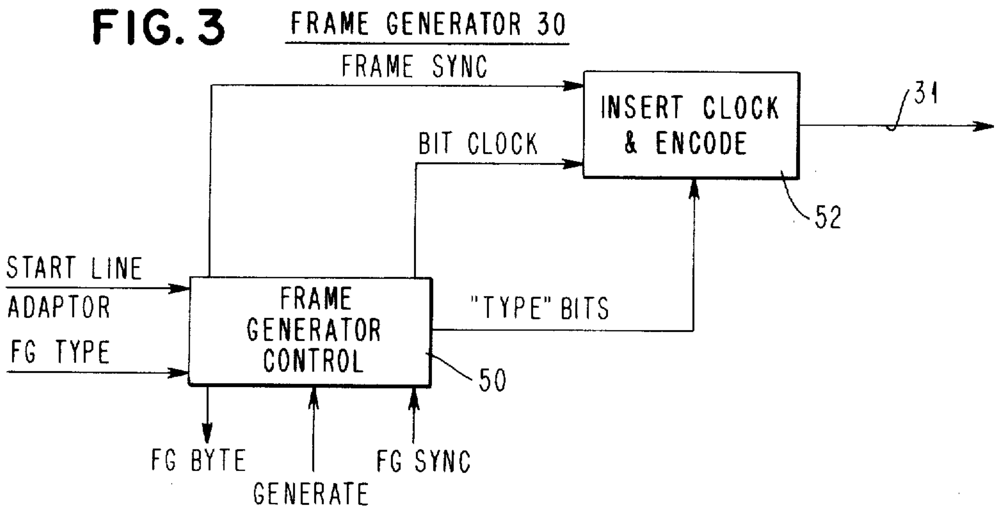
FIG. 3 is a block diagram of the frame generator hardware logic of one of the blocks of FIG. 2.

Referring to FIG. 3, the lines between a frame generator and the subsystem logic are shown. A frame generator of this type is shown in FIG. 49, and described at column 53 of U.S. Patent 3,544,976, issued to A. A. Collins on December 1, 1970 and filed July 2, 1968.

Start Line Adapter

The start-line-adapter line acts as a gate for a unit's line adapter. It prevents the generation of random signals on the Serial BCA interface when a unit's power is being cycled up or down. The logic places a logical one on start line adapter when its power supply voltages have become stable after a power-on sequence. It places a logical zero on start line adapter before these levels become unreliable on a power-down sequence.

Generate

The logic places a logical one on the generate line to signal its adapter that synchronization with other attached units is to be established. That is, interunit bit and frame synchronization is to be effected. This includes the generation of bit and frame synchronization information in the bit stream controlled by the adapter. The adapter terminates the transmission of this information upon a transition to logical zero of the generate line. A logical zero transition on generate thus results in a malfunction alert broadcast to all other attached units.

*FG* Type

The FG serializes empty and idle frames into the bit stream controlled by the adapter. The frame-type field and the frame length are controlled by the frame discipline. The frame discipline provides the frame type of the *FG* type line. A logical one on *FG* type signals the adapter that an empty frame is to be transmitted, while a logical zero calls for an idle frame.

*FG* Sync

The frame discipline signals that a new frame is to be transmitted by placing a logical one on FG Sync.

*FG* Byte

The adapter causes an upward transition on *FG* Byte to signal that it has accepted the information on *FG* Bus and *FG* Sync and that the frame discipline may gate new information to the *FG* Bus and *FG* Sync. A downward transition on *FG* Byte precludes further changes to those lines. If the adapter does not control a bit stream, it does not cause any upward transitions on *FG* Byte.

Frame Generator Sequence

Figure 9:
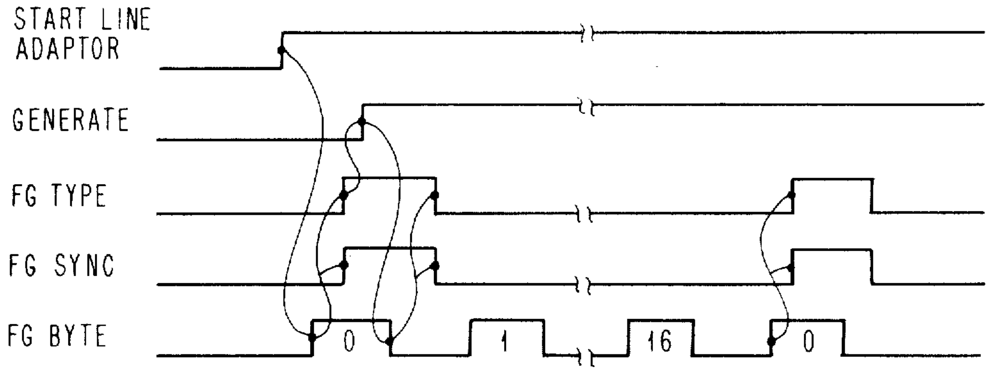
FIG. 9 is a timing diagram of a frame generator sequence.

Refer to *FG* sequence diagram, FIG. 9. The frame discipline associated with a common line adapter provides a logical one on start line adapter as soon as its power supplies are at a stable level. The adapter responds by causing a logical one transition on *FG* Byte.

The logic begins the first *FG* sequence at the logical one transition of *FG* Byte. It does so by causing a logical one transition on generate. The logic establishes the proper logical levels on *FG* Sync and *FG* Type before placing the logical one on generate. The logical one transition on generate causes the adapter to establish bit clocking information in its bit stream. After achieving bit clock continuity, the adapter begins to serialize frames in its bit stream. Each frame so generated is preceded by a frame synchronization indication. The adapter continues to serialize frames in its bit stream until a logical zero transition on either generate or start line adapter.

An FG sequence starts when the logic places information on *FG* Sync and *FG* Type. The logic may alter the information on *FG* Sync and *FG* Type whenever there is a logical one on *FG* Byte. The adapter causes a transition to a logical zero on *FG* Byte to preclude further changes. The adapter provides sufficient deskewing delay, samples *FG* Sync and *FG* Type and then signals its acceptance of these signals by causing a transition to logical one on *FG* Byte. This procedure is iterated until a logical zero transition on either generate or start line adapter intervenes.

The adapter will serialize one byte of information to its bit stream for each logical zero transition of *FG* Byte. The contents of the byte serialized are not specified unless a logical one on *FG* Sync was signalled by the logic prior to the logical zero transition on *FG* Byte. If so, the byte is preceded by a frame synchronization indication, and its first two bits contain the type field. The type field is transmitted in ascending order of frame bits, that is, frame bit 0 followed by frame bit 1, etc.

Frame Monitor

Figure 4:
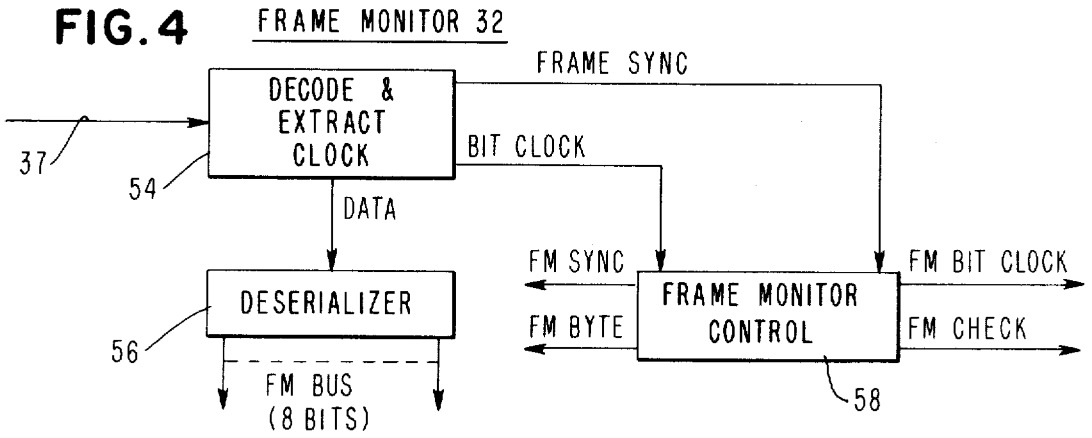
FIG. 4 is a block diagram of the frame monitor hardware logic of one of the blocks of FIG. 2.

Referring to FIG. 4, the lines between a frame monitor and the subsystem logic are shown. In the above identified Collins patent, a frame monitor of this type is shown in FIG. 51, and described at column 57.

*FM* Bus

The FM deserializes frames returning in its bit stream. The contents of a frame are transmitted to the sybsystem logic eight bits at a time, on the *FM* Bus. Frame bits 0, 8, 16,..., etc., are transmitted on *FM* bus bit 0. Frame bits 1, 9, 17,..., etc. are transmitted on *FM* Bus 1 and so on.

*FM* Sync

The *FM* places a logical one on *FM* Sync if it has detected a frame synchronization point prior to the first bit of the byte currently on the FM Bus.

*FM* Byte

The adapter signals the presence of information on the *FM* Bus and *FM* Sync with the *FM* Byte tag line. A logical one transition of *FM* Byte indicates that the frame discipline may sample the *FM* Bus and *FM* Sync, while a logical zero transition precludes further sampling.

*FM* Bit Clock

The adapter provides a logical one on *FM* Bit Clock to indicate that it is receiving bit clocking information in its bit stream. A logical zero transition on *FM* Bit Clock indicates a lack of bit clock.

*FM* Check

The adapter raises *FM* Check to signal an *FM* malfunction condition detected during the deserialization of a frame.

Frame Monitor Sequence

Figure 10:
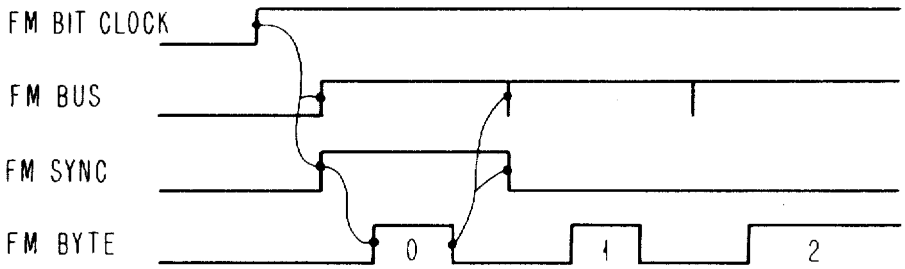
FIG. 10 is a timing diagram of a frame monitor sequence.

Refer to frame monitor sequence diagram, FIG. 10.

When the adapter detects the first frame synchronization point in its bit stream, it begins to deserialize frames for transmission to the frame discipline.

The adapter gates the first deserialized byte (8 bits) of an incoming frame to the FM Bus. It also causes a logical one transition on *FM* Sync. The adapter provides a deskewing delay and causes a logical one transition of *FM* Byte to signal that the frame discipline may sample the *FM* Bus and *FM* Sync. After a delay sufficient to allow the frame discipline to sample the *FM* Bus and *FM* Sync, the adapter causes a logical zero transition on *FM* Byte to signal that the frame discipline may no longer sample the *FM* Bus or *FM* Sync.

The adapter, after providing sufficient deskewing delay, resets the *FM* Bus and *FM* Sync, gates successive bytes of the incoming frame to the *FM* Bus, and proceeds iteratively in the fashion described in the preceding paragraph. The adapter does not, however, place a logical one on *FM* Sync until it detects a frame synchronization point immediately preceding the first bit of the byte currently on the *FM* Bus. If so, the sequence of the preceding three paragraphs applies.

The adapter places a logical one on *FM* Check in lieu of *FM* Byte if it has detected a frame synchronization point in connection with the byte currently on the *FM* Bus, but at some point other than the expected one, i.e., not preceeding the first bit of the byte).

The adapter synchronizes on the first frame synchronization point it recognizes. After that it assures that frame synchronization points occur on byte boundaries of incoming frames. Responsibility for assuring that frame synchronization points actually lie on 17-byte boundaries, i.e., a frame is 17-bytes long, lies with the frame discipline. Thus, if the frame discipline does not receive an FM Sync indication on a 17-byte boundary, or if it receives one on other than a 17-byte boundary, it signals a malfunction alert condition.

Pass Monitor Insert (PMI)

Figure 5:
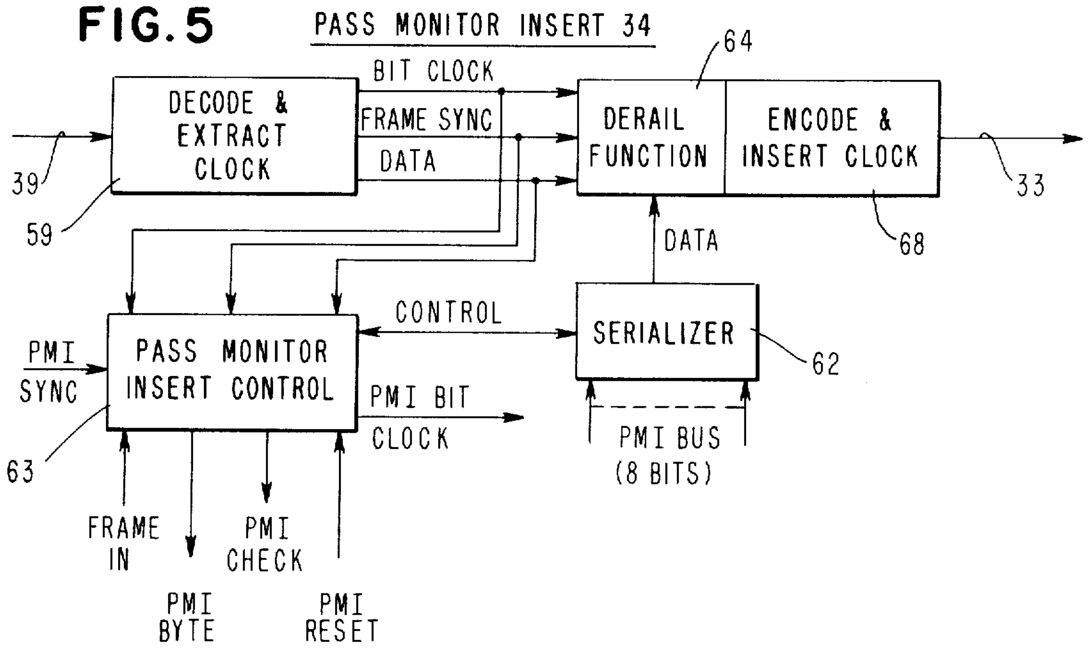
FIG. 5 is a block diagram of the pass monitor insert hardware logic of one of the blocks of FIG. 2.
Figure 8:
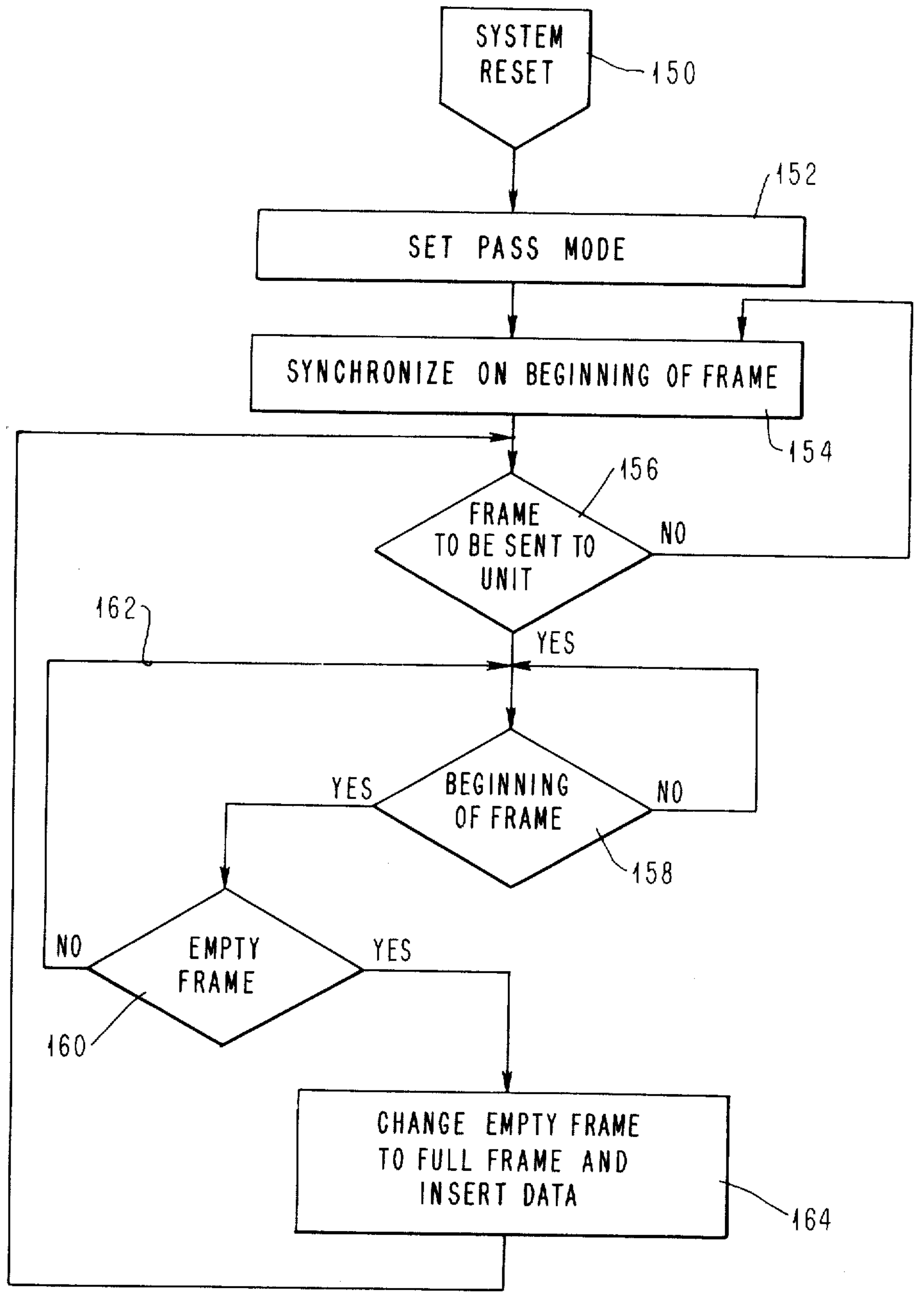
FIG. 8 is a flowchart representation of the pass monitor insert hardware logic of FIG. 5.

Referring to FIG. 5, the lines between the PMI logic and the subsystem are shown. Since the adapter has one PMI function per attached subsystem, these lines are duplicated per PMI. In the above identified Collins patent, the pass monitor insert function is performed by the loop coupler unit shown in FIG. 8 and described in column 17. The derail function 64 corresponds to the series unit 300 of Collins FIG. 8, shown in more detail in Collins Fig. 11.

PMI Bus

The PMI logic serializes frames provided by the frame logic. The frames are serialized to the bit stream from which the receiving unit extracts incoming frames. The frame logic provides the frames, eight bits at a time, on the PMI Bus for the receiver bit stream. Frame bits 0, 8, 16,..., etc., are placed on PMI bus bit 0. Frame bits 1, 9, 17,..., etc. are placed on PMI bus bit 1, and so on.

PMI Sync

The frame logic indicates that the byte currently on the PMI Bus is the first byte of a frame by placing a logical one on the proper PMI Sync.

Frame In

The frame discipline indicates that a frame is to be sent to an attached unit by placing a logical one on the proper Frame In.

PMI Byte

The adapter causes logical zero transition on the proper PMI Byte to signal that it has accepted the information on the corresponding PMI Bus and PMI Sync, and furthermore, that the frame logic may gate new information to the PMI Bus and PMI Sync. A logical zero on PMI Byte precludes further changes to those lines.

PMI Check

The adapter places a logical one on PMI Check to signal a malfunction during the serialization of the current frame.

PMI Reset

The frame logic resets a PMI via the corresponding PMI Reset line.

PMI Bit Clock

THE adapter signals the presence of Bit Clock synchronization with a given bit stream by placing a logical one on the corresponding PMI Bit Clock line.

Pass Monitor Insert (PMI) Sequence

Figure 11:
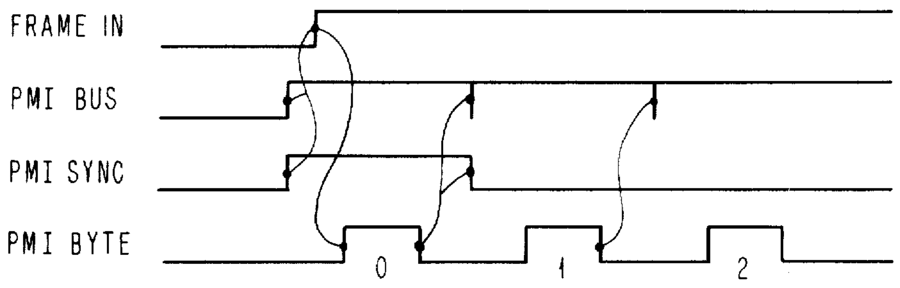
FIG. 11 is a timing diagram of a pass monitor insert sequence.

Refer to frame monitor sequence diagram, FIG. 11.

The frame logic when it wishes to activate a PMI function, causes a logical one transition on the proper PMI Reset.

A PMI sequence begins when the frame logic gates information to the PMI Bus, places a logical one on PMI Sync and then causes a logical one on Frame In. The frame logic may alter these lines only during a logical zero interval on PMI Byte. The adapter signals that the PMI Bus, PMI Sync, and Frame In may no longer be changed by causing a logical one transition on PMI Byte. After a deskewing delay, the adapter samples the information. It then signals that the frame logic may gate the next byte to the PMI Bus by causing a logical zero transition on PMI Byte.

The frame logic gates successive bytes of the frame to the PMI Bus and iterates the sequence of the preceding paragraph. The frame logic does not, however, place a logical one on PMI Sync or a logical zero on Frame In until the last byte of the frame has been accepted. The frame logic may gate new information to PMI Sync, and Frame IN at the logical zero transition of PMI Byte which signifies the acceptance of the last byte of a frame. The sequence of the preceding two paragraphs is iterated. It is triggered by an up-level on Frame In.

When transmitting a frame, the PMI detects a malfunction and causes a logical one transition on PMI Check in the following situations:

(1) The frame logic has indicated that the last byte serialized was the final byte in a frame (either by causing a logical zero transition on Frame In after its acceptance by the adapter or by placing a logical one on PMI Sync to accompany the next byte sent to the adapter) but the adapter did not detect a frame synchronization point immediately following the last bit of the frame.

(2) The adapter detects a frame synchronization point at other than a byte boundary.

(3) The adapter detects a frame synchronization point before it has serialized all of the bytes in a frame from the frame logic.

The adapter signals a malfunction by causing a logical one transition on PMI Check. The upward transition may occur after the adapter has accepted the first byte of a new frame. A PMI Check situation prevents that transmission of this new frame, however. The frame discipline responds to PMI Check by dropping all of its inputs to the PMI function, if any. The frame logic then executes a PMI Reset sequence by dropping the PMI Reset line.

Description of Operation

Referring to FIG. 2. The logic 28 of the basic channel adapter 20 for controlling the generation, monitoring, and insertion of data into frames is shown in logic flowchart form in FIGS. 6, 7, and 8.

Figure 6:
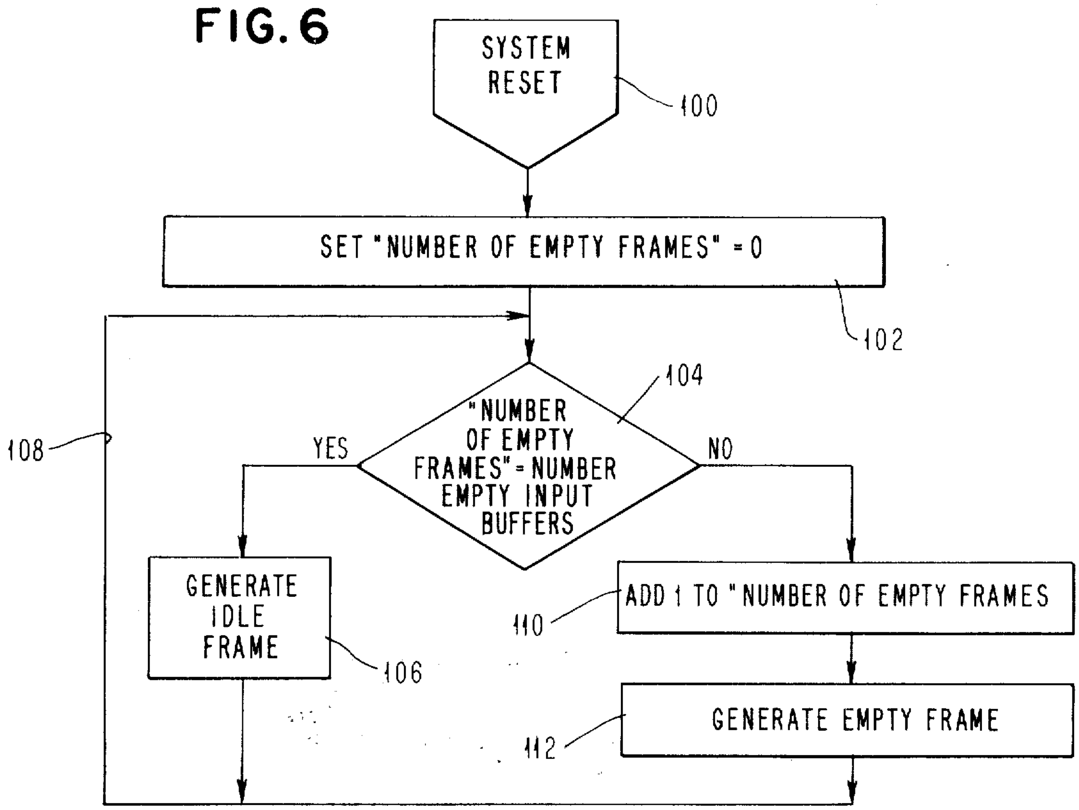
FIG. 6 is a flowchart representation of the frame generator hardware logic of FIG. 3.

Referring to FIG. 6, after a system reset 100, the logic 28 of FIG. 2 sets the number of empty frames equal to zero, block 102. Subsequently the following loop is performed by the logic to continuously generate frames. At decision block 104, a test is made to see if the number of empty frames is equal to the number of input buffers (40 in FIG. 2) available for use. If the number of empty frames is equal to the number of buffers, then the logic generates an idle frame, block 106, by changing the frame type field T to binary 11. The logic then returns via loop 108 and a test is again made. If the number of empty frames is not equal to the number of empty input buffers, then the logic generates an empty frame. This is done by first adding one to the number of empty frames which is maintained by the logic at block 110. Then the logic generates an empty frame (block 112) by changing the frame type to $T =$ binary 1 0. The loop 108 is followed again and the same process continues frame after frame.

Referring to FIG. 3, the type bits are inserted into the frame by means of the frame generator control logic 50. A logical 1 on the *FG* type signal line causes an empty frame code (10) to be transmitted while a logical zero causes an idle frame code (11) to be transmitted.

Referring again to FIG. 2, once the frame generator 30 has generated a frame, it is transmitted over transmission line 31 to the pass monitor insert logic 60 of loop adapter 24. The pass monitor insert logic communicates with logic 61 which will be described subsequently with respect to FIG. 8. It suffices to say that the frame is passed through the pass monitor insert 60 to the pass monitor insert 62 of loop adapter 22. The frame is transmitted back to channel adapter 20 by means of line 37 which inputs to the frame monitor 32. The frame monitor communicates with the frame monitor portion of logic 28 which is described with respect to FIG. 7.

Figure 7:
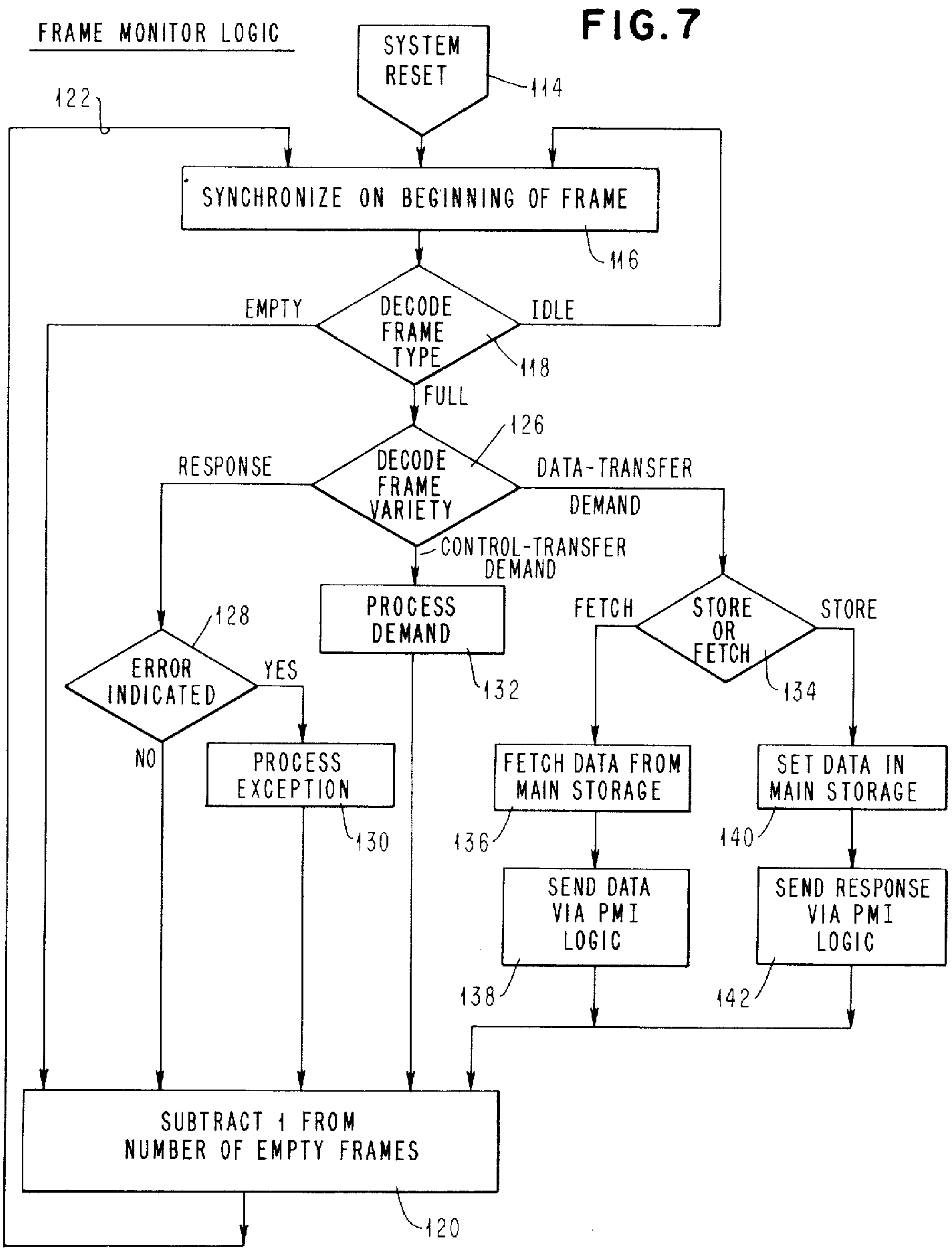
FIG. 7 is a flowchart representation of the frame monitor hardware logic of FIG. 4.

Referring to FIG. 7 after a system reset 114, the frame monitor synchronizes on the beginning of the frame (block 116). The decode block 54 shown in FIG. 4 decodes the frame type into either a full, idle, or empty frame, (decision block 118 of FIG. 7).

If an empty frame is decoded, the flow proceeds directly to logic block 120 of FIG. 7 wherein one is subtracted from the number of empty frames maintained in the logic of the subsystem and the flow returns by means of loop 122 to logic block 116.

If an idle frame is detected, no change is made to the number of empty frames and the logic returns directly by means of loop 24 to logic block 116.

If a full frame is decoded, the logic proceeds to decision block 126 which decodes the frame variety. If a data or control transfer response frame is decoded, the flow proceeds to block 128 which tests for an error indication. If an error has occurred, an error routine is performed at block 130 and the flow proceeds to block 120. If no error was indicated, the flow proceeds directly to block 120 wherein one is subtracted from the number of empty frames and the flow returns to block 116.

If a control transfer demand frame is decoded, the logic proceeds to block 132 wherein the demand is processed by the frame monitor logic of FIG. 4. Referring to FIG. 4, the data is decoded at block 54 and transferred to the deserializer 56 and placed on the *FM* bus to the subsystem logic. The logic of FIG. 4 frame monitor control 58 signals the presence of information on the *FM* bus and *FM* sync with the *FM* byte tag line which is energized. A logical one on the *FM* byte tag line indicates that the frame logic may sample the *FM* bus and *FM* sync while a logical zero precludes further sampling. If a malfunction occurs, a signal is generated on FM check.

Returning now to FIG. 7, if the decision block 126 decodes a data transfer demand, the flow proceeds to decision block 134. The demand for data transfer may be either a store or a fetch.

If a fetch is indicated, the flow proceeds to block 136 and a data fetch is made from main storage. The data fetched is sent to the subsystem by means of the pass monitor insert logic as indicated by block 138. The pass monitor insert function is described subsequently with respect to FIG. 8.

If a store operation is indicated, the logic sets the data into main storage as indicated by block 140 and a response is sent by means of the PMI logic as indicated by block 142.

At the conclusion of either a fetch or a store operation the flow proceeds to block 120 in which one is subtracted from the number of empty frames and returns via loop 122 to logic block 116.

Referring now to FIG. 8, the pass monitor insert (PMI) logic is described.

After a system reset 150, the logic sets pass mode 152 and synchronizes on a beginning of a frame 154. Synchronization is performed by logic block 60 of FIG. 5 which decodes and extracts the frame sync, bit block and data from the bit stream 39.

Flow in FIG. 8 proceeds to decision block 156 in which a decision is made as to whether the frame is to be sent to the unit receiving the frame. If no, then the flow proceeds back to block 154 and synchronization is performed on the next frame. If yes, the flow continues to decision block 158 at which the beginning of the frame is detected and the flow continues to logic block 160. At 160 a decode function is performed to determine if it is an empty frame. If not, the flow returns via loop 162 to await the beginning of the next frame. If yes, the empty frame indication is changed to indicate a full frame (block 164). Data is inserted by means of the serializer logic block 62 of FIG. 5 which receives 8 bits of information on the PMI bus which is transferred in serial form to the derail logic 64. From the derail logic the data is encoded and clocking information is inserted at logic 68 and transmitted back into the loop 33.

SUMMARY

What has been described is a receiver driven communication system in which data are transmitted by means of frames over a closed serial loop. At least two loops are necessary for communication between a first and second subsystem. A first loop carries a demand frame and a second loop carries a response frame. Additional subsystems can be added by adding additional loops. It is the receiving unit that generates the frames and therefore, drives the loop.

A receiving subsystem has means for generating a frame which is passed to a sending subsystem and returned to the receiving subsystem which monitors the frame and extracts data therefrom. The sending subsystem monitors the frame and puts data or control information into the frame. The frame is then received by the receiving system which extracts the data and/or control information and composes a resonse to be sent to the sending system. The sending system, since it must receive the response, generates a frame on a second loop, which frame is monitored by the other subsystem which inserts the response information into the frame. The frame returns via the second loop to the sending subsystem which extracts the data and/or control information. Means are provided within each frame to correlate the demand-control information with the responsecontrol information. That is, the demand frame contains an identification field which is extracted by the receiving subsystem and used to correlate the response frame composed by the receiving subsystem. The identification is placed in the response frame and when the response frame is received at the sending subsystem, the identification is used to correlate the response frame with the demand frame which requires that response. Thus, the interface performs data and control transfer operations on a demand/response basis but in a serial rather than a parallel manner.

While the invention has been particularly shown and described with reference to a preferred embodiment thereof, it will be understood by those skilled in the art that various changes in form and details may be made therein without departing from the spirit and scope of the invention.

What is claimed is:

1. A multiple station receiver-driven communication system comprising:

a sending subsystem;

a receiving subsystem;

means at said receiving subsystem for generating an empty frame and for inserting type bits into said frame to indicate that the frame is an empty frame or an idle frame;

means at said receiving subsystem for monitoring frames and extracting data therefrom;

transmission loop means connecting said generating means and said monitoring means;

means at said sending subsystem connected in series with said loop means for passing said frames through said subsystem; and means associated with said last mentioned means for inserting data into said empty frame as it passes through said sending subsystem.

2. The combination according to claim 1 including an additional transmission loop and means at said sending subsystem for generating an empty frame and an idle frame in said additional loop and for monitoring frames;

means at said receiving subsystem connected in series with said additional loop for passing said empty and idle frames through said receiving subsystem; and means associated with said last mentioned means for inserting data into said empty frame as it passes through said receiving subsystem.

3. The combination according to claim 2 wherein said empty frame generated in said transmission loop and said empty frame generated in said additional loop include a bit field therein in which an indicator may be inserted for correlating information generated in one loop with information generated in the other loop.

4. A serial demand response interface for communicating between first and second data processing subsystems comprising:

means for transmitting data and control information on a first loop which comprises means in said first subsystem for generating a frame on said loop;

means at said second subsystem in series with said first loop for passing said frame through said subsystem and for inserting data and/or control information into said frame;

means at said first subsystem for receiving said frame and for extracting said data and/or control information therefrom;

means at said second subsystem responsive to control information received on said first transmission loop for generating a frame on a second loop;

means at said first subsystem in series with said second loop for receiving said frame on said second loop and for inserting data and/or control information therein and transmitting said frame back to said second subsystem; and means at said second subsystem for receiving said frame on said second loop and for extracting said data and/or control information therefrom.

5. A serial demand-response interface for connecting a first subsystem and a second subsystem comprising:

means in said first subsystem for generating a first frame over a first transmission loop to said second subsystem;

means in said second subsystem for receiving said first frame and for inserting a demand-control function into said frame and for re-transmitting said frame to said first subsystem over said first loop;

means at said first subsystem for receiving said first frame and for processing said demand;

means in said second subsystem for generating a second frame over a second transmission loop to said first subsystem; and means in said first subsystem for receiving said second frame and for inserting a response-control function, related to said processed demand-control function, into said frame and for re-transmitting said frame to said second subsystem over said second loop.

6. The combination according to claim 5 wherein said means for inserting a demand-control function includes means for inserting identification information into said first frame for correlating said first frame with said second frame.

7. A serial demand response interface for communicating between a first subsystem and a second subsystem comprising:

a first transmission loop driven by said first subsystem;

a second transmission loop driven by said second subsystem;

means at said first subsystem for inserting control information and/or data in said second loop; and means at said second subsystem for inserting control information and/or data in said first loop.

8. The combination according to claim 7 wherein said means for inserting control information includes means for inserting identification information for correlating said information in said first loop with said information in said second loop.

* * * * *